US005377296A

United States Patent [19]

Greenway et al.

[11] Patent Number: 5,377,296

[45] Date of Patent: Dec. 27, 1994

[54] MINE WINDER OR HOIST DRUM ELECTRIC MOTOR CONTROL FOR PREVENTING EXCITATION OF OSCILLATION

[76] Inventors: Malcolm E. Greenway, 61 Churchill Ave., Wendywood, Sandton, Transvaal, South Africa; Winfried E. Schmitt, Ahornweg 24, 8520 Erlangen, Germany; Rodney S. Hamilton, 5 Essex Gardens, Rotherfield Ave., Essexwold, Bedfordview, Transvaal, South Africa

[21] Appl. No.: 761,699

[22] Filed: Sep. 18, 1991

[51] Int. Cl.[5] .............................................. H02P 5/00

[52] U.S. Cl. ..................................... 388/816; 226/25; 388/930

[58] Field of Search ............... 318/6, 7, 270; 388/816, 388/869, 830, 930; 226/25, 26, 42–45, 62; 242/189–192, 75, 75.1, 75.3, 75.42, 75.51

[56] References Cited

U.S. PATENT DOCUMENTS 4,084,116 4/1978 Arter et al. ............................ 318/6
4,136,302 1/1979 Tlaker et al. .................. 318/571 X
4,232,257 11/1980 Harshberger .................. 318/270 X
4,347,993 9/1982 Leonard ............................ 318/6 X
4,513,898 4/1985 Spitsbergen ...................... 226/45 X
4,565,334 1/1986 Ruhl ................................ 242/75.51
4,632,325 12/1986 Feyerl et al. ................. 242/75.2 X

*Primary Examiner*—Jonathan Wysocki
*Attorney, Agent, or Firm*—Fish & Richardson

[57] ABSTRACT

The invention provides a control system for an electric motor arranged to drive a rope drum of a mine winder or a hoist system which includes a conveyance supported by a rope and which forms an oscillating system. The control system includes load sensor which monitors the load in the rope and a rope length sensor which monitors the length of rope paid out from the rope drum. A motor control unit is responsive to signals from the sensors and calculates setpoints for speed, acceleration and jerk of the oscillating system. The control unit generates a control signal which is related to a natural oscillation mode of the oscillating system so as to prevent the excitation of oscillations in the system, and controls a motor drive in accordance with the control signal.

19 Claims, 5 Drawing Sheets

MINE WINDER OR HOIST DRUM ELECTRIC MOTOR CONTROL FOR PREVENTING EXCITATION OF OSCILLATION

BACKGROUND OF THE INVENTION

This invention relates to a control system for an electric motor, which is arranged to drive a rope drum of a mine winder or a similar hoist system.

A mine winder or hoist usually employs an electric motor which is connected to at least one rope drum, and commonly two rope drums. A cage or conveyance is attached to the free end of a rope which is wound on the drum, so that rotation of the drum raises or lowers the conveyance in a mine shaft. Usually, the winding arrangement is such that one conveyance is raised as the other is lowered.

Deep mine shafts, such as those encountered in the gold mining industry, necessitate long rope lengths. In such systems, oscillations are induced in the flexible system comprising the conveyances, ropes, the inertia of the motor and winding drums, and possibly other travelling masses in the system. Such oscillations are excited, in particular, by winding drum accelerations which occur during normal winding and during emergency braking. The effect is a longitudinal dynamic displacement of the cage at the end of the rope with an undesirably large amplitude, which causes increased tensile loading of the rope. This necessitates the use of a stronger rope than would be required for steady-state operation, increasing the mass and cost of the rope and limiting the attainable shaft depth.

It is an object of the invention to provide a control system for normal operation and emergency braking which reduces the longitudinal oscillations.

SUMMARY OF THE INVENTION

According to the invention there is provided a control system for an electric motor arranged to drive a rope drum of a mine winder or a hoist system which includes a conveyance supported by a rope and which forms an oscillating system, the control system comprising:

- a load sensor arranged to monitor the load in the rope and to provide
- a load signal corresponding thereto;
- a rope length sensor arranged to monitor the length of rope paid out from the rope drum and to provide a rope length signal corresponding thereto;
- a motor control unit responsive to the load signal and the rope length signal and being adapted to calculate setpoints for speed, acceleration and jerk of the oscillating system; and further being adapted to generate a control signal which is related to a natural oscillation characteristic of the oscillating system or a portion thereof to prevent the excitation of oscillations in the system; and
- motor drive means for controlling the current supplied to the motor in accordance with the control signal.

The oscillating system may include the conveyances, ropes, motor, sheaves, drums and any associated travelling masses.

Preferably, the natural oscillating characteristic of the oscillating system or the portion thereof is a fundamental oscillation frequency thereof.

The motor control unit may be adapted to generate the control signal so that the jerk period of the oscillating system is related to the period of a natural oscillation mode of the oscillating system or the portion thereof.

A supplementary speed setpoint, which is determined by the jerk setpoint, may be applied to the speed setpoint during jerk periods.

Preferably, the supplementary speed setpoint is represented by the jerk setpoint divided by the square of the angular frequency of a natural oscillation mode of the oscillating system or the portion thereof.

Alternatively, the supplementary speed can be weighted sum of the jerk setpoint and the second derivative with respect to time of the jerk setpoint. The weighting factors are determined by the angular frequencies of any two natural oscillation modes of the oscillating system or the portion thereof.

The motor control unit is preferably responsive to the rope length sensors and load sensors to calculate the periods of the natural oscillation modes of the oscillating system or the portion thereof from the rope lengths and the magnitude of loads carried by the conveyances, and to calculate the setpoints in terms thereof. The moment of inertia of the rope drums and motor may also be taken into account.

The system preferably includes a safety brake control unit which is operable in conjunction with the motor control unit to prevent the excitation of oscillations in the oscillating system during braking.

The motor control unit may be connected to the brake control unit by a communication link via which the angular frequencies of natural oscillation modes of the oscillating system are continually transferred to the brake control unit.

The brake control unit preferably includes a tachometer for continually measuring the rope drum speed, a ramp-function generator for input of a jerk-limited speed setpoint, a speed controller with a secondary braking force regulator for controlling a control valve of the brake, and a switch for initiating emergency braking.

DESCRIPTION OF AN EMBODIMENT

Figure 1:
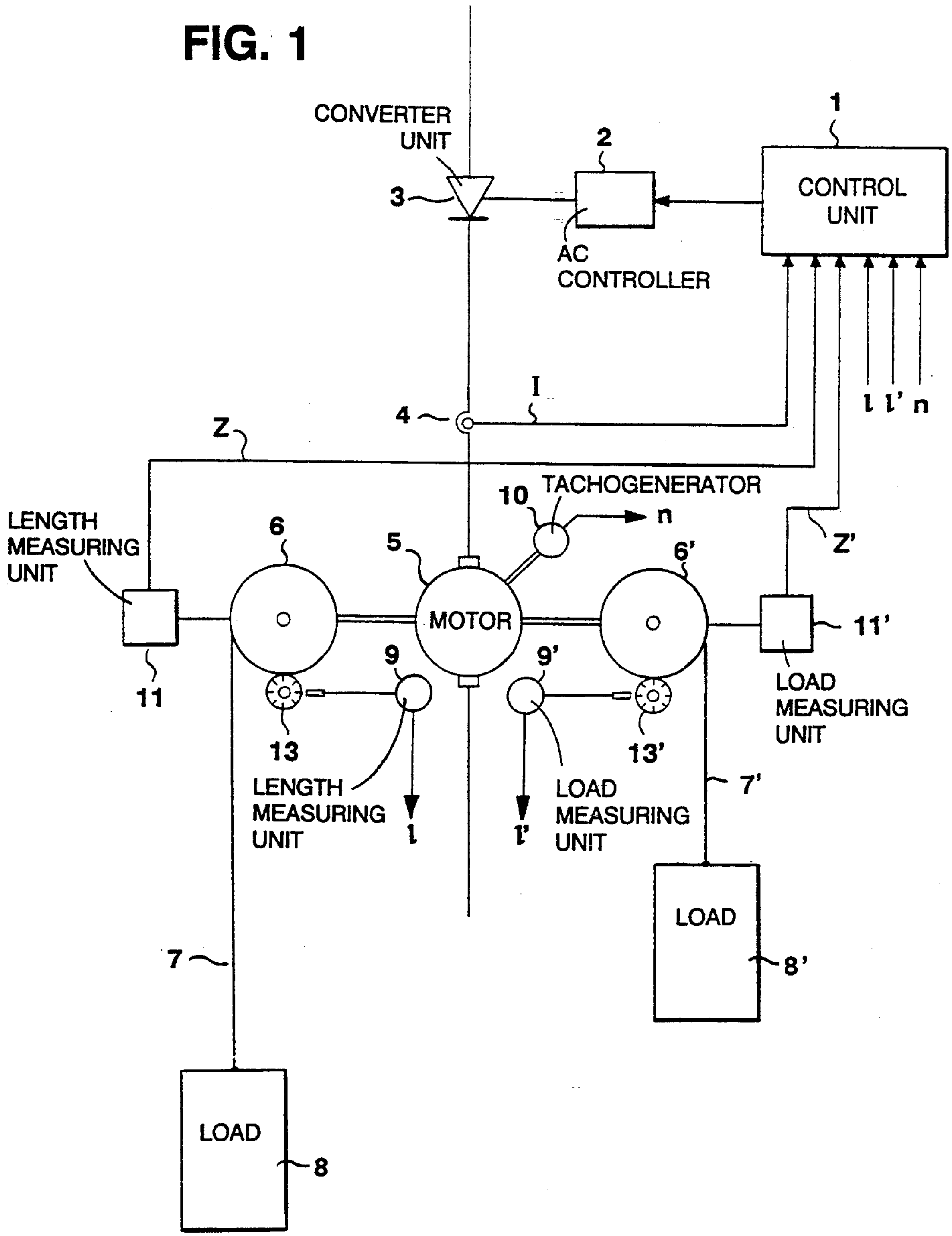
FIG. 1 is a schematic illustration of a mine winder arrangement according to the invention.

Referring first to FIG. 1, an electric motor 5 has twin output shafts which are connected to two rope drums 6 and 6'. Loads 8 and 8' (typically mine cages or conveyances) are connected to ropes 7 and 7' which are wound onto the drums 6 and 6'. The drums 6 and 6' are connected to the motor 5 in such a way that when the load 8 is lowered, the load 8' is raised, and vice versa. It will be appreciated that instead of a motor having twin output shafts, a single shaft motor could also used, with an appropriate transmission system.

Rope length measuring units 9 and 9' are provided which monitor the length of rope which has been paid out from each drum and generate respective rope length signals 1 and 1' which are fed to a control unit 1, which may comprise a programmable logic controller (PLC). The rope length measuring units 9 and 9' measure the lengths of the respective ropes 7 and 7' by sensing the rotation and the direction of rotation of rotary encoders 13 and 13' which are coupled to the drums 6 and 6'. Instead of the measuring units 9 and 9', the rope lengths could also be measured using an absolute position transducer connected to the motor 5.

A tachogenerator 10 measures the speed of rotation of the motor 5 and generates a speed signal n which is also fed to the control unit 1. Similarly, the motor current is measured by a current transducer 4, and a signal I corresponding to the magnitude of the motor current is fed from the current transducer 4 to the control unit 1. Finally, load measuring units 11 and 11' measure the instantaneous magnitude of the tensile loads in the ropes 7 and 7' and provide output signals Z and Z' corresponding thereto to the control unit 1. The control unit 1 controls an AC controller 2, which controls the supply of current to the motor 5 via a converter unit 3.

It will be appreciated that the motor 5 could be of any type (AC or DC) and could be configured in any suitable variable speed drive configuration. The current supplied by the converter unit 3 is shown for simplicity as a single quantity, but could contain both field and armature circuits as well as multiple phases in the case of AC drives. In essence, the AC controller regulates the current(s) supplied to the motor such that the torque produced is effectively controlled by the control unit 1. In the case of an AC drive system, the AC controller 2 would also control the frequency of the current(s) via the converter 3.

The load measuring units 11 and 11' measure the tensile loads in the ropes by measuring the loads on the headgear sheaves (not shown) of the winder system. Values M and M' corresponding to the masses of the loads 8 and 8' can be calculated from the output signals Z and Z' of the load measuring units, taking into account the mass per unit length $\rho$ and $\rho'$ of the ropes and the calculated rope lengths 1 and 1'.

The loads 8 and 8' with their associated ropes 7 and 7', together with the rope drums 6 and 6' and the motor 5 form the components of an oscillating system. When the drive motor 5 is stationary, the rope drums 6 and 6' are also stationary. The loads 8 and 8' with their associated ropes 7 and 7' comprise spring/mass systems, which are decoupled. When the motor 5 is running, this changes. Firstly, the spring/mass systems comprising the respective loads and ropes are coupled through the motor 5. The lengths 1 and 1' of the ropes 7 and 7' change continually, thus varying the natural oscillating frequency of the two spring/mass systems. The total moment of inertia of the motor 5 and the rope drums 6 and 6' remains almost constant, because as the load 8' is lowered, the load 8 is raised and vice versa. This means that the increase in the moment of inertia of the drum 6 caused by the rope being wound up is almost equally matched by the reduction in the moment of inertia of the rope drum 6' occurring simultaneously. However, the system oscillation characteristics can nevertheless change as a result of the coupling of the spring/mass systems. Generally speaking, however, the electrical control of the motor 5 is "stiff" enough to ensure that the spring/mass systems can be considered as being decoupled even when the motor is running.

The situation will now be considered where the motor 5 is stationary. In practice this is also the most important case, as it is during starting and stopping of the motor that oscillations can be excited by the acceleration or deceleration which occurs. In the decoupled condition referred to above, the angular frequency $\omega_i$ of the spring/mass system's natural oscillations is obtained by solving the equation:

$$z_i \tan(z_i) = \rho l/M \qquad \text{(Equation 1)}$$

with $$z_1 = \omega_i l \sqrt{\rho/EA}$$

E is the effective Young's modulus and A the steel cross-sectional area of the rope 7, and $\omega_i$ is defined as:

$$\omega_i = 2\pi/T_i \qquad \text{(Equation 2)}$$

where $T_i$ is the period of the natural oscillation mode of the system, and where i can have values 0, 1, 2, . . . .

The system fundamental natural oscillation frequency is obtained by solving equation (1) with the smallest value $\omega_0$ or the largest value $T_0$. The harmonics are obtained from the other solutions. Similar equations apply for the second system comprising the load 8' and the rope 7'.

The load values Z and Z' in the ropes 7 and 7' are fed from the load measuring units 11 and 11' to the control unit 1, together with the calculated actual rope lengths 1 and 1' from the rope length measuring units 9 and 9'. The control unit 1 then calculates the masses M and M' of the loads 8 and 8', and in turn the natural frequencies $\omega_i$ and $\omega_i'$ of the decoupled systems, using the known Young's moduli E, E', the rope cross-sectional areas A and A' and the masses per unit length $\rho$ and $\rho'$ of the ropes 7 and 7'. The control unit 1 computes the angular frequencies $\omega_i$ and $\omega_i'$ continually.

When a change of speed is requested, either by a manual command from an operator or by a stored program, the control unit 1 calculates setpoints n*, $\alpha$* and r* for the speed, angular acceleration and "jerk" of the motor 5 so that oscillations are not excited in the two oscillating systems. "Jerk", r, refers to the second derivative of speed with respect to time, i.e.:

$$r = d^2n/dt^2 \qquad \text{(Equation 3)}$$

Avoiding the excitation of oscillations can, for example, be achieved by making the jerk periods (periods in which the jerk r is not zero) equal to a natural oscillation period of the system. It is particularly important that the fundamental mode with the lowest frequency of the two decoupled systems (assume $\omega_0$) is not excited, as the resulting oscillations have the highest amplitude.

As an alternative or in addition, a supplementary speed setpoint $\Delta n$* can be added to the speed setpoint n* in order to suppress oscillations in another mode of the system or to further suppress oscillations in the same mode. This supplementary speed setpoint is equal to the jerk setpoint r* divided by the square of the angular frequency of the chosen mode. The fundamental mode of the decoupled system not chosen to set the jerk period is usually chosen to calculate the supplementary setpoint, i.e.:

$$\Delta n^* = r^*/\omega_0'^2 \quad \text{(Equation 4)}$$

The use of a jerk dependent supplementary speed setpoint will be referred to as "compensation". When such "compensation" is used, it is not essential that the jerk period be matched to the period of a natural oscillation mode as described above, although this will usually be done.

Figure 2:
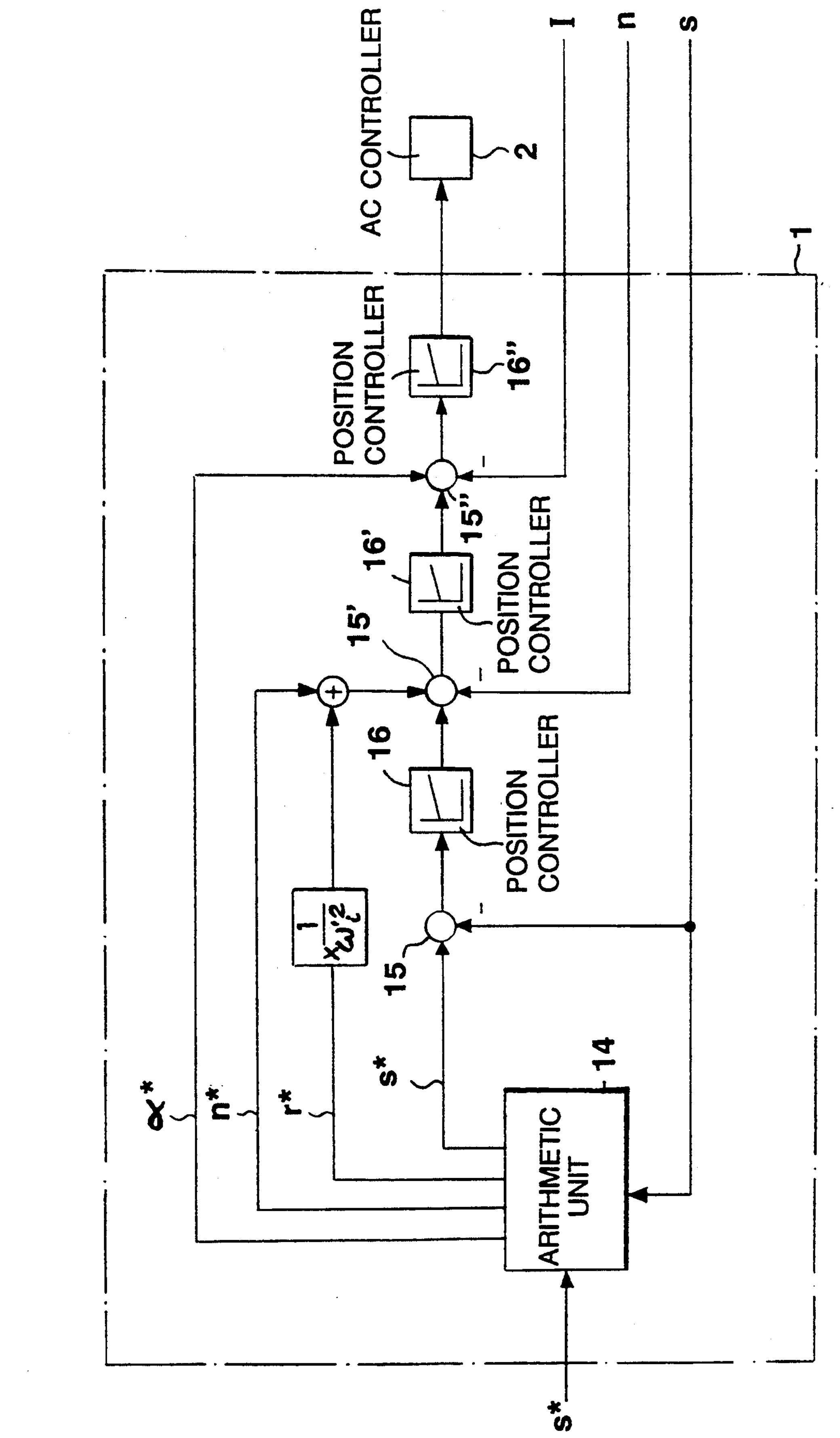
FIG. 2 is a block schematic diagram of a closed-loop motor control circuit for the arrangement of FIG. 1.
Figure 4A:
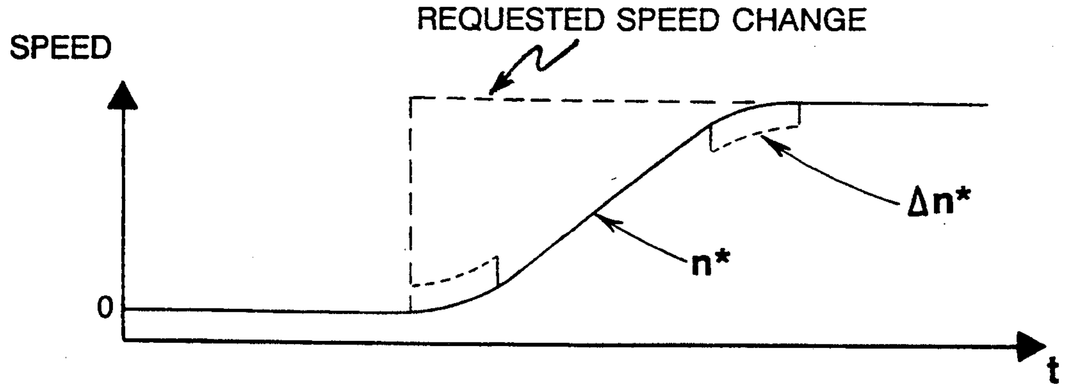
FIGS. 4*a* to 4*c* are diagrams illustrating setpoints generated by the system.
Figure 4B:
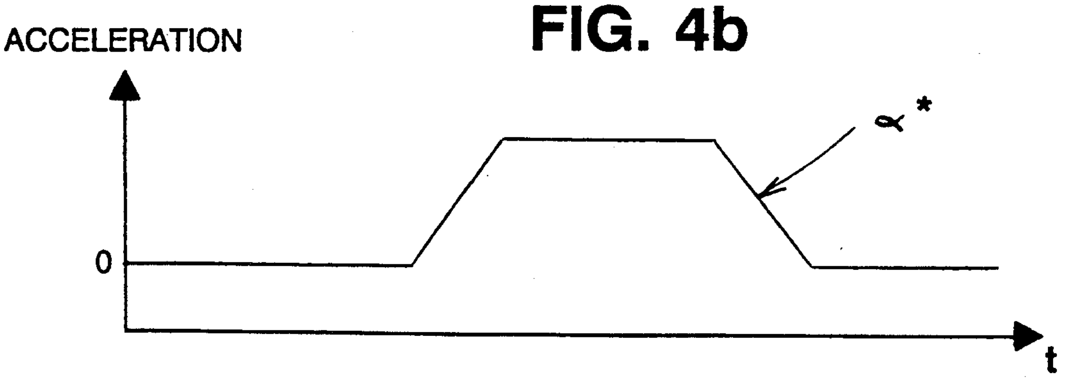
Figure 4C:
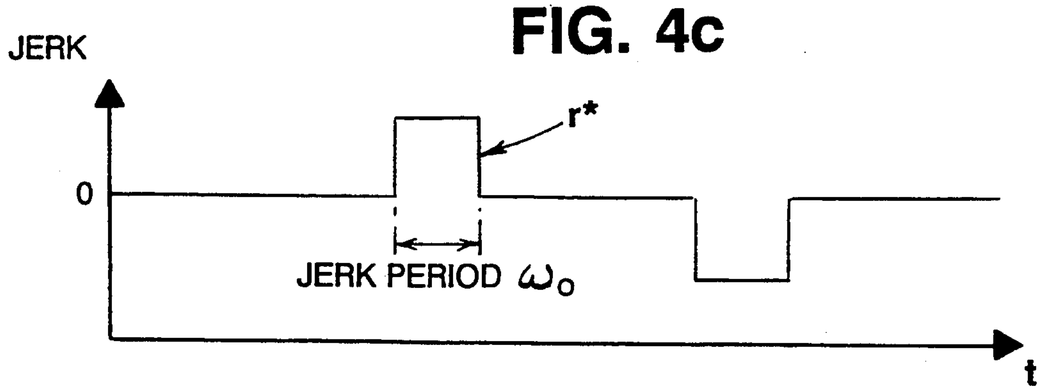
Figure 5A:
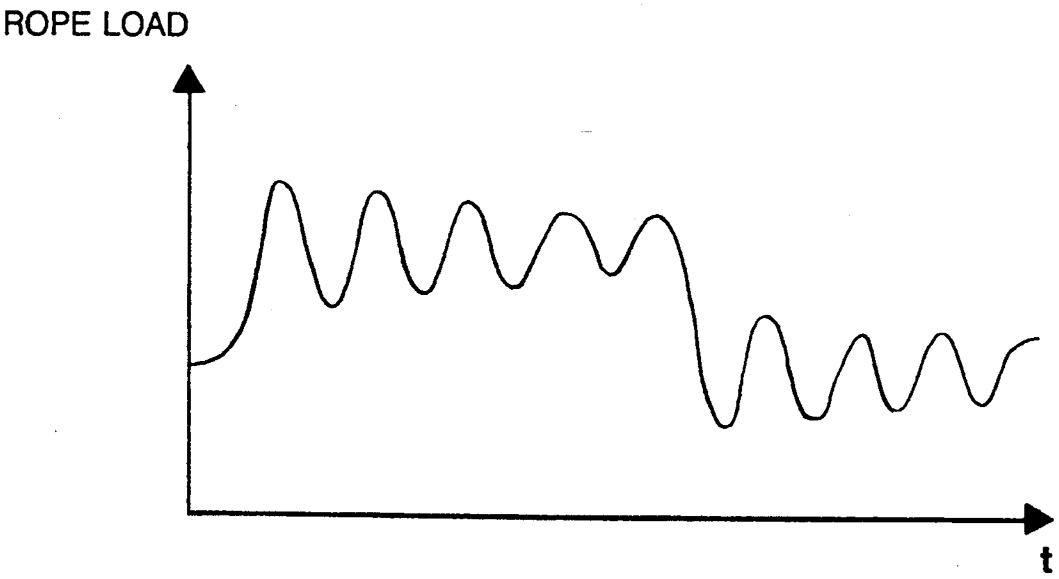
FIGS. 5*a* and 5*b* are graphs comparing the performance of the system of the invention with a prior art system.
Figure 5B:
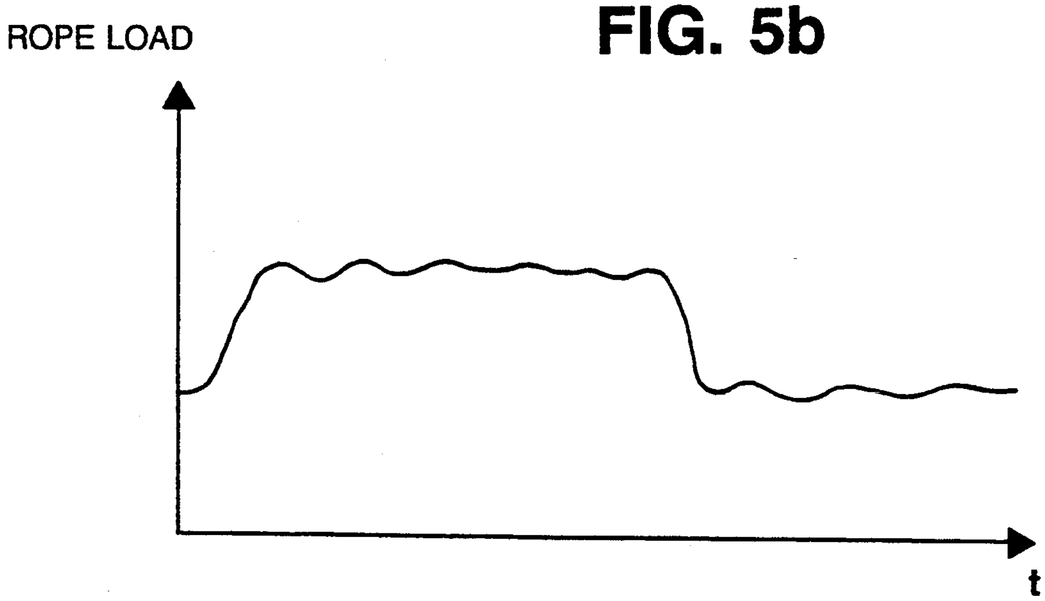
Figure 1:
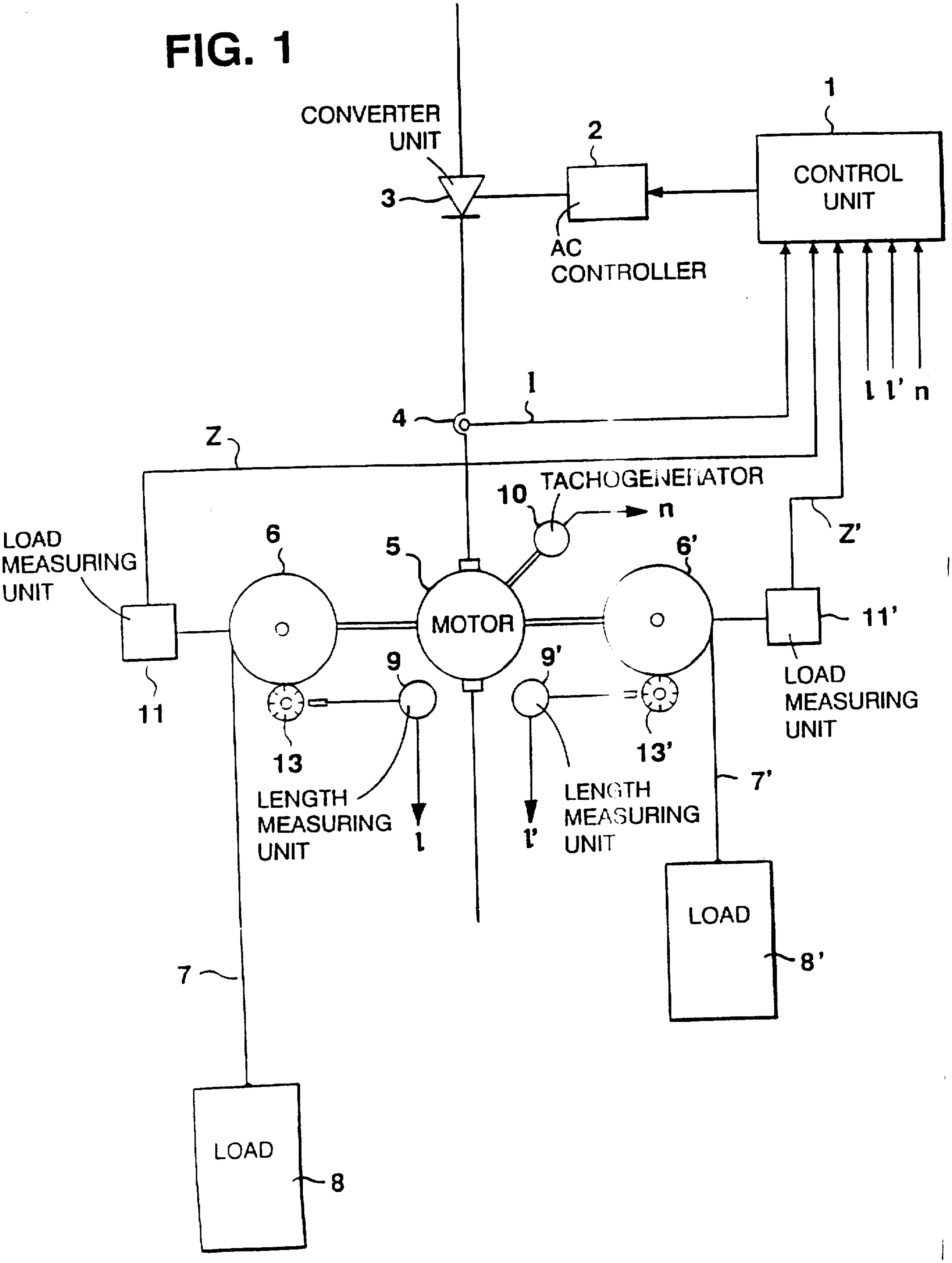

FIG. 2 is a schematic block diagram of the automatic control unit 1 of FIG. 1. The unit includes an arithmetic unit 14 which is adapted to receive a position setpoint s*, for example, for the load 8, either externally or from a program stored in the memory of the control unit. The arithmetic unit 14 calculates control setpoints s*, $\alpha^*$ and r* to control the motor 5 on the basis of the difference between the position setpoint s* and the actual positions s of the load 8. The arithmetic unit 14 outputs the setpoints n*, $\alpha^*$ and r* and the position setpoint s*. The setpoint n*, $\alpha^*$ and r* as well as the supplementary speed setpoint $\Delta n^*$, generated by the control unit, are illustrated in FIGS. 4a to 4c. The difference between the position setpoint s* and the position s of the load 8 is calculated in a summation function block 15. The difference is applied as an input signal to a position controller 16, the output signal of which is a speed setpoint. In manual operation of the control system, this setpoint can be set by an operator. The magnitude of this speed setpoint is limited to the value $n^*+r^*/\omega_0'^2$ and the difference from the speed setpoint obtained in this manner and the speed n is calculated in a further summation block 15'. The output of this block is fed as an input signal to a speed controller 16' whose output signal, which is a current setpoint, is limited in an analogue fashion by the angular acceleration setpoint $\alpha^*$ before the difference between this value and the current I of the motor 5 is calculated in a third summation function block 15". This difference value serves as the input signal to a further current controller 16", the output signal of which controls the AC controller 2.

"Compensation" can also be used to suppress oscillations in two modes of the system simultaneously. In this case, the supplementary speed setpoint $\Delta n^*$ is a weighted sum of the jerk setpoint r* and the second derivative with respect to time of the jerk setpoint $d^2r^*/dt^2$. If the natural frequencies $\omega_x$ and $\omega_y$ are to be compensated for, the supplementary speed setpoint is given by:

$$\Delta n^* = \left(\frac{1}{\omega_x^2} + \frac{1}{\omega_y^2}\right)r^* + \left(\frac{1}{\omega_x^2\omega_y^2}\right)\frac{d^2r^*}{dt^2} \quad \text{(Equation 5)}$$

If compensation of two modes is to be implemented, a speed reference functiion n* with a finite fourth derivative $d^4n^*/dt^4$ must be used. Two functions which satisfy this criterion are:

1. Constant fourth derivative, $\frac{d^4n^*}{dt^4} = \pm\frac{32\alpha_m^*}{T_o}$ 2. Cycloidal front acceleration reference function $\alpha^*$, $$\alpha^* = \pm\frac{\alpha_m^*}{2\pi}\left(\frac{2\pi t}{T_o} - \sin\pm\frac{2\pi t}{T_o}\right)$$

where $\alpha_m^*$ is the maximum acceleration setpoint and $T_0$ is the jerk time.

The control unit 1 controls the motor 5 with a position control and a secondary speed and current control. In this case, the current control is equivalent to an acceleration control. The motor 5 follows the control rapidly through the setpoints n*, $\alpha^*$ and r* with typical delay times of less than 0, 1 second. By preventing unwanted oscillations in the ropes 7 and 7', load peaks in the ropes are reduced, and it is thus possible to use ropes of smaller cross-section, or to hoist heavier loads from greater depths.

The condition of the coupled spring/mass systems must also be considered in the case where the operating parameters of the drive motor 5 change during operation, for example where the speed n and the condition of the decoupled systems cannot be considered. In this case, the system natural oscillations can be determined using the results of system simulations or trial runs if a computational solution is too complex or otherwise not possible.

The advantages of the described system are only fully realised if undesired oscillations in the ropes are alleviated under all conditions, that is, even when the winder is subject to a mechanical emergency stop. It is thus advantageous if the mechanical safety brakes which are normally fitted to the rope drums 6 and 6' are also controlled as described above.

Figure 3:
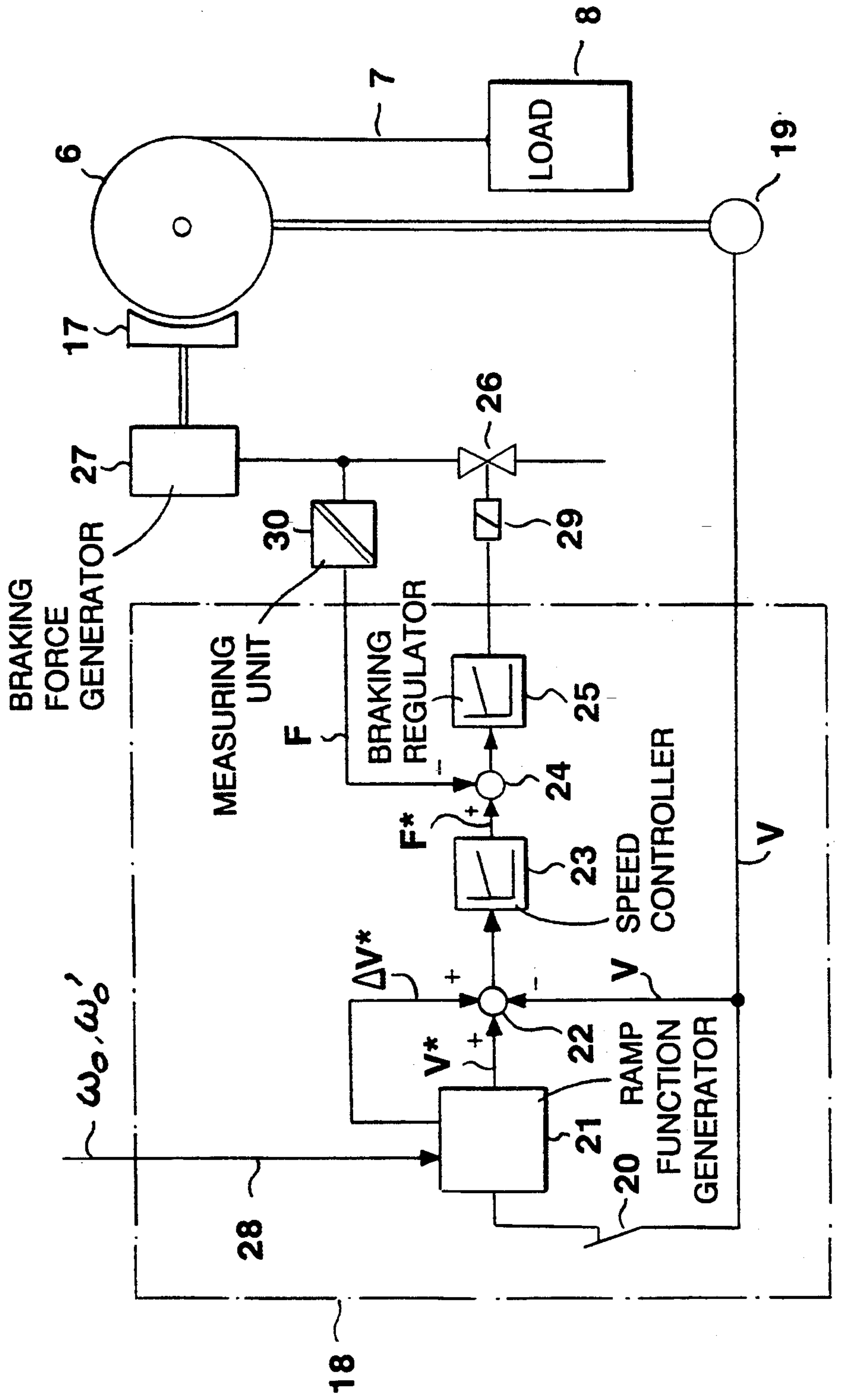
FIG. 3 is a schematic block diagram of a closed-loop brake control circuit for the system of FIG. 1.

FIG. 3 is a block schematic diagram of a closed-loop control circuit (18) for a mechanical safety brake 17 associated with the rope drum 6. Generally speaking, each of the rope drums 6 and 6' will have at least two mechanical safety brakes. However, for reasons of clarity, only a single safety brake is illustrated. The speed v of the drum 6 is continually measused by a tachometer 19, the output of which is fed to a ramp-function generator 21 as an input signal, via a switch 20 which is closed during normal operation. The ramp-function generator 21 continually receives signals corresponding to the angular frequencies $\omega_0$ and $\omega_0'$ and other possible angular frequencies calculated by the control unit 1. Taking into account the transferred angular frequencies $\omega_0$ and $\omega_0'$, the ramp-function generator 21 calculates a setpoint v* for the hoist speed of the rope drum 6. The difference between the speed setpoint v* and the speed v is calculated in a summation function block 22. A jerk-dependent supplementary setpoint $\Delta v^*$ is applied to this difference if required. When the mine winder is operating normally, the difference as calculated above, which is used as an input signal to a speed controller 23, is zero due to the adjustment of the control of the speed ramp-function generator 21 to the speed setpoint n* of the arithmetic unit 14. As a result, the output of the speed controller 23, which is proportional to a braking force setpoint F*, is also zero. Thus, in normal operation, the safety brake 17 is not actuated.

When the emergency braking must be initiated, for example, because the closed-loop drive control fails, the switch 20 is opened. No signal is then present at the input to the ramp-function generator 21. The ramp-function generator 21 now adjusts the speed setpoint v* down to zero, taking into account the last transferred angular frequencies $\omega_0$ and $\omega_0'$, so that the rope drum 6 and thus the load 8 come to rest. The input signal which is applied to the speed controller 23, and thus its output, are no longer zero during braking. The difference between the braking force setpoint F* and the braking force F (derived from measuring unit 30) is calculated in a summation function block 24 and an actuating signal for a valve 26 is generated by a braking power regulator circuit 25, according to the difference. A control valve 26, which is preferably a proportional valve, controls the pressure of a braking force generator 27 and thus the braking force F of the safety brake 17. As the time characteristic of the speed setpoint v* is adapted to the system oscillation characteristic, as described above, oscillation of the system is prevented even during emergency braking.

As an alternative, the output of the speed controller 23 can be proportional to the position of the brake engine of the safety brake 17. In this case, the block 25 represents a brake position regulator and the block 30 would measure the position of the brake 17.

The circuitry in the brake control unit is preferably configured redundantly. The natural frequencies $\omega_0$ and $\omega_0'$ are preferably input to the brake controller via a communications link 28, which may be a standard interface.

The invention allows an existing closed-loop motor control circuit to be supplied with optimal setpoint signals, to improve its dynamic operating characteristics, particularly in mine winder or hoist systems using long ropes.

FIGS. *5a* and *5b* illustrate graphically the improvement over a prior art winder system (FIG. *5a*) when the control system of the invention is incorporated (FIG. *5b*).

We claim:

1. A control system for an electric motor arranged to drive a rope drum of a mine winder or a hoist system which includes a conveyance supported by a rope and which forms an oscillating system having at least one natural oscillating mode, the control system comprising:

a load sensor arranged to monitor the load in the rope and to provide a load signal corresponding thereto;

a rope length sensor arranged to monitor the length of rope paid out from the rope drum and to provide a rope length signal corresponding thereto;

a motor control unit responsive to the load signal and the rope length signal to calculate a period of at least one natural oscillation mode of the oscillating system or a portion thereof from the rope length and the magnitude of the load in the rope, and to calculate setpoints in terms thereof for speed, acceleration and jerk of the oscillating system; and further being adapted to generate a control signal which is related to the at least one natural oscillation mode of the oscillating system or portion thereof to prevent excitation of oscillations in the oscillating system; and motor drive means for controlling the current supplied to the motor in accordance with the control signal.

2. A control system according to claim 1 wherein the oscillating system includes a conveyance, a rope, a sheave, a rope drum, and the electric motor.

3. A control system according to claim 2 wherein the oscillating system includes a pair of conveyances with respective ropes, sheaves and rope drums.

4. A control system according to claim 1 wherein the natural oscillating characteristic of the oscillating system or the portion thereof is a fundamental oscillation frequency thereof.

5. A control system for an electric motor arranged to drive a rope drum of a mine winder or a hoist system which includes a conveyance supported by a rope and which forms an oscillating system, the control system comprising:

a load sensor arranged to monitor the load in the rope and to provide a load signal corresponding thereto;

a rope length sensor arranged to monitor the length of rope paid out from the rope drum and to provide a rope length signal corresponding thereto;

a motor control unit responsive to the load signal and the rope length signal and being adapted to calculate setpoints for speed, acceleration and jerk of the oscillating system; and further being adapted to generate a control signal so that the jerk period of the oscillating system is related to the period of a natural oscillation mode of the oscillating system or the portion thereof to prevent the excitation of oscillations in the system; and motor drive means for controlling the current supplied to the motor in accordance with the control signal.

6. A control system according to claim 1 wherein the motor control unit is adapted to apply a supplementary speed setpoint, which is determined by the jerk setpoint, to the speed setpoint during jerk periods.

7. A control system for an electric motor arranged to drive a rope drum of a mine winder or a hoist system which includes a conveyance supported by a rope and which forms an oscillating system, the control system comprising:

a load sensor arranged to monitor the load in the rope and to provide a load signal corresponding thereto;

a rope length sensor arranged to monitor the length of rope paid out from the rope drum and to provide a rope length signal corresponding thereto;

a motor control unit responsive to the load signal and the rope length signal and being adapted to calculate setpoints for speed, acceleration and jerk of the oscillating system, said motor control unit being adapted to apply a supplementary speed setpoint, which is represented by the jerk setpoint divided by the square of the angular frequency of a natural oscillation mode of the oscillating system or the portion thereof, to the speed setpoint during jerk periods; and further being adapted to generate a control signal which is related to a natural oscillation characteristic of the oscillating system or portion thereof to prevent the excitation of oscillations in the system; and motor drive means for controlling the current supplied to the motor in accordance with the control signal.

8. A control system for an electric motor arranged to drive a rope drum of a mine winder or a hoist system which includes a conveyance supported by a rope and which forms an oscillating system, the control system comprising:

a load sensor arranged to monitor the load in the rope and to provide a load signal corresponding thereto;

a rope length sensor arranged to monitor the length of rope paid out from the rope drum and to provide a rope length signal corresponding thereto;

a motor control unit responsive to the load signal and the rope length signal and being adapted to calculate setpoints for speed, acceleration and jerk of the oscillating system, said motor control unit being adapted to apply a supplementary speed setpoint, which is a weighted sum of the jerk setpoint and the second derivative with respect to time of the jerk setpoint, to the speed setpoint during jerk periods; and further being adapted to generate a control signal which is related to a natural oscillation characteristic of the oscillating system or portion thereof to prevent the excitation of oscillations in the system; and motor drive means for controlling the current supplied to the motor in accordance with the control signal.

9. A control system according to claim 8 wherein the weighting factors are determined by the angular frequencies of selected natural oscillation modes of the oscillating system or the portion thereof.

10. A control system according to claim 1 wherein the control unit is further adapted to calculate the setpoints in terms of the moment of inertia of the rope drums and the motor.

11. A control system according to claim 1 wherein the or each rope length sensor comprises a rotary encoder associated with the or each rope drum.

12. A control system according to claim 1 wherein the or each rope length sensor comprises an absolute position transducer associated with the electric motor.

13. A control system according to claim 1 wherein the or each rope length sensor is adapted to sense both the displacement and the direction of displacement of the rope with which it is associated.

14. A control system according to claim 1 wherein the or each load sensor is adapted to measure the load on a sheave supporting the rope with which the load sensor is associated.

15. A control system according to claim 1 wherein the motor control unit is adapted to calculate load values including the mass of the or each conveyance and the mass of its associated rope.

16. A control system according to claim 15 wherein the motor control unit calculates the mass of the or each rope from the output of the respective rope length sensor and the mass per unit length of the rope.

17. A control system according to claim 1 including a brake control unit which is operable in conjunction with the motor control circuit and a brake to prevent the excitation of oscillations in the oscillating system during braking.

18. A control system for an electric motor arranged to drive a rope drum of a mine winder or a hoist system which includes a conveyance supported by a rope and which forms an oscillating system, the control system comprising:

a load sensor arranged to monitor the load in the rope and to provide a load signal corresponding thereto;

a rope length sensor arranged to monitor the length of rope paid out from the rope drum and to provide a rope length signal corresponding thereto;

a motor control unit responsive to the load signal and the rope length signal and being adapted to calculate setpoints for speed, acceleration and jerk of the oscillating system; and further being adapted to generate a control signal which is related to a natural oscillation characteristic of the oscillating system or portion thereof to prevent the excitation of oscillations in the system;

motor drive means for controlling the current supplied to the motor in accordance with the control signal; and a brake control unit which is operable in conjunction with the motor control circuit and a brake to prevent the excitation of oscillations in the oscillating system during braking, said motor control unit being connected to the brake control unit by a communication link via which the angular frequencies of natural oscillation modes of the oscillating system are continually transferred to the brake control unit.

19. A control system according to claim 18 wherein the brake control unit includes a tachometer for continually measuring the rope drum speed, a ramp-function generator for input of a jerk-limited speed setpoint, a speed controller with a secondary braking force regulator for controlling a control valve of the brake, and a switch for initiating emergency braking.

* * * * *

UNITED STATES PATENT AND TRADEMARK OFFICE
CERTIFICATE OF CORRECTION

PATENT NO. : 5,377,296

DATED : December 27, 1994

INVENTOR(S) : Malcolm E. Greenway et al

It is certified that error appears in the above-indentified patent and that said Letters Patent is hereby corrected as shown below:

The title page, showing the illustrative figure, should be deleted to be replaced with the attached title page.

The drawing sheet, consisting of Fig. 1, should be deleted to be replaced with the drawing sheet, consisting of Fig.1, as shown on the attached page.

United States Patent [19] | [11] Patent Number: 5,377,296
Greenway et al. | [45] Date of Patent: Dec. 27, 1994

[54] MINE WINDER OR HOIST DRUM ELECTRIC MOTOR CONTROL FOR PREVENTING EXCITATION OF OSCILLATION

[76] Inventors: Malcolm E. Greenway, 61 Churchill Ave., Wendywood, Sandton, Transvaal, South Africa; Winfried E. Schmitt, Ahornweg 24, 8520 Erlangen, Germany; Rodney S. Hamilton, 5 Essex Gardens, Rotherfield Ave., Essexwold, Bedfordview, Transvaal, South Africa

[21] Appl. No.: 761,699

[22] Filed: Sep. 18, 1991

[51] Int. Cl.⁵ .......... H02P 5/00
[52] U.S. Cl. .......... 388/816; 226/25; 388/930
[58] Field of Search .......... 318/6, 7, 270; 388/816, 388/869, 830, 930; 226/25, 26, 42–45, 62; 242/189–192, 75, 75.1, 75.3, 75.42, 75.51

[56] References Cited

U.S. PATENT DOCUMENTS 4,084,116 4/1978 Arter et al. .......... 318/6
4,136,302 1/1979 Tlaker et al. .......... 318/571 X
4,232,257 11/1980 Harshberger .......... 318/270 X
4,347,993 9/1982 Leonard .......... 318/6 X
4,513,898 4/1985 Spitsbergen .......... 226/45 X
4,565,334 1/1986 Ruhl .......... 242/75.51
4,632,325 12/1986 Feyerl et al. .......... 242/75.2 X

*Primary Examiner*—Jonathan Wysocki
*Attorney, Agent, or Firm*—Fish & Richardson

[57] ABSTRACT

The invention provides a control system for an electric motor arranged to drive a rope drum of a mine winder or a hoist system which includes a conveyance supported by a rope and which forms an oscillating system. The control system includes load sensor which monitors the load in the rope and a rope length sensor which monitors the length of rope paid out from the rope drum. A motor control unit is responsive to signals from the sensors and calculates setpoints for speed, acceleration and jerk of the oscillating system. The control unit generates a control signal which is related to a natural oscillation mode of the oscillating system so as to prevent the excitation of oscillations in the system, and controls a motor drive in accordance with the control signal.

19 Claims, 5 Drawing Sheets

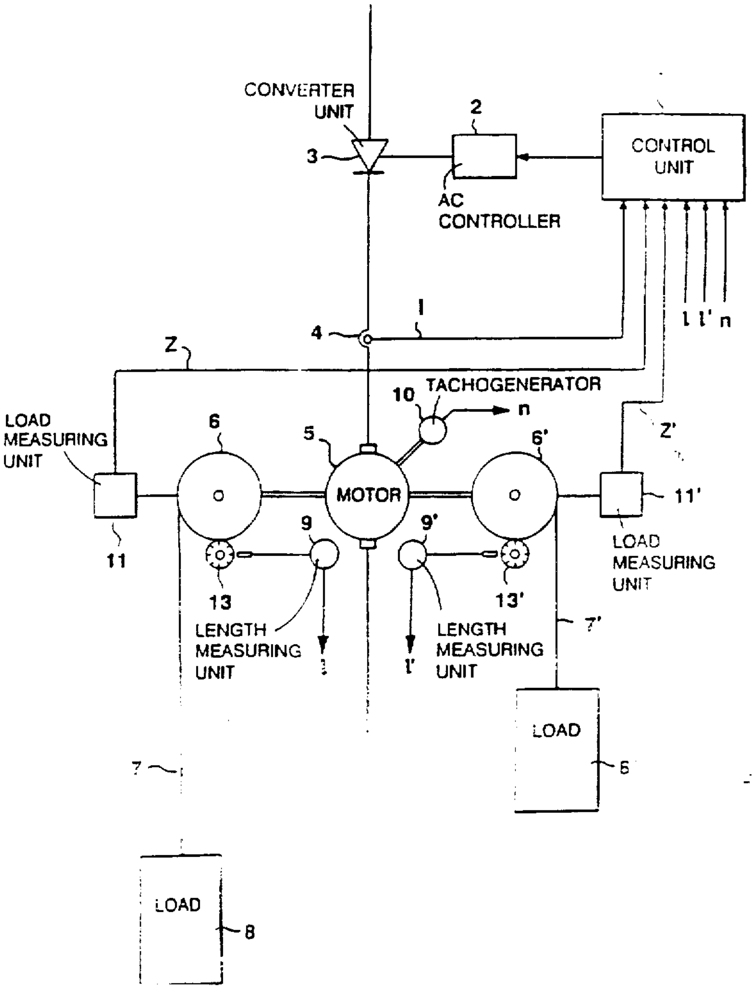

UNITED STATES PATENT AND TRADEMARK OFFICE

CERTIFICATE OF CORRECTION

PATENT NO. : 5,377,296

DATED : December 27, 1994

INVENTOR(S) : Malcolm E. Greenway et al

It is certified that error appears in the above-indentified patent and that said Letters Patent is hereby corrected as shown below:

Col. 2, line 11, after "speed", insert --setpoint --.

Signed and Sealed this

Twenty-eighth Day of May, 1996

Attest:

Bruce Lehman

BRUCE LEHMAN

*Attesting Officer*

*Commissioner of Patents and Trademarks*